(12) United States Patent
Perea et al.

(10) Patent No.: US 10,473,452 B2
(45) Date of Patent: Nov. 12, 2019

(54) METHOD FOR PHASE RESOLVED HETERODYNE SHEAROGRAPHIC MEASUREMENTS

(71) Applicant: United States of America, as represented by the Secretary of the Army, Fort Belvoir, VA (US)

(72) Inventors: James D. Perea, Alexandria, VA (US); Bradley W. Libbey, Alexandria, VA (US)

(73) Assignee: UNITED STATES OF AMERICA, AS REPRESENTED BY THE SECRETARY OF THE ARMY, Pentagon Washington, DC (US)

( * ) Notice: Subject to any disclaimer, the term of this patent is extended or adjusted under 35 U.S.C. 154(b) by 0 days.

(21) Appl. No.: 16/111,665

(22) Filed: Aug. 24, 2018

(65) Prior Publication Data

US 2019/0011247 A1     Jan. 10, 2019

Related U.S. Application Data

(62) Division of application No. 15/427,079, filed on Feb. 8, 2017, now Pat. No. 10,088,292.

(51) Int. Cl.
    *G01B 9/02*       (2006.01)
    *G01B 9/00*       (2006.01)
    *G01H 9/00*       (2006.01)

(52) U.S. Cl.
    CPC ..... *G01B 9/02032* (2013.01); *G01B 9/02007* (2013.01); *G01B 9/02022* (2013.01);
(Continued)

(58) Field of Classification Search
    CPC ............ G01B 9/02098; G01B 9/02032; G01B 9/02007; G01B 9/02022; G01B 9/02038;
(Continued)

(56) References Cited

U.S. PATENT DOCUMENTS

| 4,687,332 A | 8/1987 | Bareket |
| 4,913,547 A | 4/1990 | Moran |

(Continued)

OTHER PUBLICATIONS

James Perea, Brad Libbey, and George Nehmetallah, "Multiaxis heterodyne vibrometer for simultaneous observation of 5 degrees of dynamic freedom from a single beam," Opt. Lett. 43, 3120-3123 (Year: 2018).*

(Continued)

*Primary Examiner* — Dominic J Bologna
*Assistant Examiner* — Violeta A Prieto
(74) *Attorney, Agent, or Firm* — Richard J. Kim

(57) ABSTRACT

A phase-resolved heterodyne shearing interferometer has been developed for high-rate, whole field observations of transient surface motion. The sensor utilizes polarization multiplexing and multiple carrier frequencies to separate each segment of a shearing Mach-Zehnder interferometer. Post-processing routines have been developed to recombine the segments by extracting the scattered object phase from Doppler shifted intermediate carrier frequencies, providing quantitative relative phase changes and information to create variable shear, phase resolved shearographic fringe patterns without temporal or spatial phase shifting.

4 Claims, 3 Drawing Sheets

(52) U.S. Cl.
CPC ..... *G01B 9/02038* (2013.01); *G01B 9/02084* (2013.01); *G01B 9/02089* (2013.01); *G01H 9/00* (2013.01); G01B 2290/70 (2013.01)

(58) Field of Classification Search
CPC ............ G01B 9/02084; G01B 9/02089; G01B 2290/70; G01H 9/00
See application file for complete search history.

(56) References Cited

U.S. PATENT DOCUMENTS

| | | | |
|---|---|---|---|
| 6,236,507 B1 | 5/2001 | Hill et al. | |
| 6,717,681 B1 | 4/2004 | Bard et al. | |
| 6,847,452 B2 | 1/2005 | Hill | |
| 7,742,174 B2 | 6/2010 | Izatt et al. | |
| 8,144,334 B2* | 3/2012 | Chinn | G01H 9/004 356/482 |
| 9,476,700 B2 | 10/2016 | DeWeert et al. | |
| 9,651,477 B1 | 5/2017 | Libbey et al. | |
| 9,995,761 B2* | 6/2018 | Libbey | G01H 9/002 |
| 10,088,292 B2* | 10/2018 | Perea | G01B 9/02032 |
| 2003/0053073 A1* | 3/2003 | Hill | G03F 7/70775 356/498 |
| 2003/0169505 A1 | 9/2003 | Mendlovic et al. | |
| 2005/0078295 A1 | 4/2005 | Tansey | |
| 2011/0174078 A1 | 7/2011 | Chinn et al. | |
| 2017/0285063 A1 | 10/2017 | Libbey et al. | |
| 2018/0224266 A1* | 8/2018 | Perea | G01B 9/02032 |

OTHER PUBLICATIONS

F. Languy et al., "Vibration mode shapes visualization in industrial environment by real-time time-averaged phase-stepped electronic speckle pattern interferometry at 10.6 mm and shearography at 532 nm," Optical Engineering 55 (12), pp. 121704-1 thru 9 (2016).

W. J. Bisle et al., "Improved shearography for use on optical non cooperating surfaces under daylight conditions," AIP Conference Proceedings 557, pp. 1928-1935 (2001).

W. Steinchen and L. Yang, Digital shearography: theory and application of digital speckle pattern shearing interferometry, SPIE press Bellingham, Chapter 3, pp. 55-61 (2003).

L. Yang and X. Xie, Digital shearography: New Developments and Applications, SPIE press Bellingham, Chapter 4, pp. 53-62 (2016).

D.I. Serrano-García, et al., Dynamic phase profile of phase objects based in the use of a quasi-common path interferometer, Optik—Int. J. Light Electron Opt. (2012), http://dx.doi.org/10.1016/j.ijleo.2012.02.044.

S. Yoneyama and S. Arikawa, "Instantaneous phase-stepping interferometry based on a pixelated micro-polarizer array," Theoretical and Applied Mechanics Letters 6, 162-166 (2016).

G. Rodríguez-Zurita et al., "One-shot phase stepping with a pulsed laser and modulation of polarization: application to speckle interferometry," Optics express vol. 23, No. 18, 23414-23427 (2015).

X. Xie et al., "Polarized digital shearography for simultaneous dual shearing directions measurements," Review of Scientific Instruments 87, 083110 (2016).

X. Xie et al., "Michlelson interferometer based spatial phase shift shearography," Applied optics vol. 52, No. 17, 4063-4071 (2013).

Y. Fu et al., "Interferometric Dynamic Measurement: Techniques Based on High-Speed Imaging or a Single Photodetector," Hindawi Publishing Corporation, The Scientific World Journal, vol. 2014, Article ID 232906, Published May 12, 2014 https:/www.hindawi.com/journals/tswj/2014/232906/.

* cited by examiner

METHOD FOR PHASE RESOLVED HETERODYNE SHEAROGRAPHIC MEASUREMENTS

REFERENCE TO RELATED APPLICATIONS

This is a divisional patent application of copending application Ser. No. 15/427,079 filed Feb. 08, 2017, entitled "Method and Apparatus for Phase Resolved Heterodyne Shearographic Measurements." The aforementioned application is hereby incorporated herein by reference.

GOVERNMENT INTEREST

The invention described herein may be manufactured, used, sold, imported, and/or licensed by or for the Government of the United States of America.

FIELD OF THE INVENTION

The present invention relates to coherent optical vibration sensing, specifically for phase resolved measurements of transient surface motion.

BACKGROUND OF THE INVENTION

Shearography is an optical metrology technique utilized for vibration analysis and strain measurements. A basic shearographic sensor utilizes a shearing interferometer which mixes the measured signal with a shifted version of itself. The shearing interferometer generates a self-reference, mitigating sensor vibration and some environmental effects. (See, Languy et al., "Vibration mode shapes visualization in industrial environment by real-time time-averaged phase-stepped electronic speckle pattern interferometry at 10.6 mm and shearography at 532 mm," Optical Engineering 55 121704-121704 (2016). See, also, Disk et. al,, "Improved shearography for use on optical non cooperating surfaces under daylight conditions," in "AIP Conference Proceedings,"(IOP Institute of Physics Publishing LTD, 2001), B, pp. 1928-1935.) However, the output from a basic shearographic sensor, referred to as a fringe pattern, may only be used for qualitative analysis. (See, Steinchen and Yang, Digital shearography: theory and application of digital speckle pattern shearing interferometry (SPIE press Bellingham, 2003).) Phase resolved measurements, necessary to quantify the measured shearogram, are typically performed by temporal or spatial phase shifting. (See, Yang and Xie, Digital shearography: New Developments and Applications (SPIE press Bellingham, 2016).) Temporal phase shifting requires stepped motors in the received optical path to generate additional frames and is not suitable for transients. (See Languy et al., "Vibration mode shapes visualization in industrial environment by real-time time-averaged phase-stepped electronic speckle pattern interferometry at 10.6 mm and shearography at 532 nm," Optical Engineering 55, 121704-121704 (2016).) Observation of transient motion is possible by spatial phase shifting, but requires dividing the received focal plane array into four quadrants and adjusting the polarization state of each quadrant or by creating four spatial frequency carriers by adjusting the angle of incidence. (See, Serrano-Garcia al., "Dynamic phase profile of phase objects based the use of a quasi-common path interferometer," Optik-International Journal for Light and Electron Optics 123, 1742-1745 (2012); Yoneyama and Arikawa, "Instantaneous phase-stepping interferometry based on a pixelated micro-polarizer array," Theoretical and Applied Mechanics Letters (2016); Rodriguez-Zurita et al., "One-shot phase stepping with a pulsed laser and modulation of polarization: application to speckle interferometry," Optics express 23, 23414-23427 (2015); Xie et al., "Polarized digital shearography for simultaneous dual shearing directions measurements," Review of Scientific Instruments 87, 083110 (2016); and Xie et al., "Michelson interferometer based spatial phase shift shearography," Applied optics 52, 4063-4071 (2013).) Additionally, interrogation of large fields of view at long distances require significant optical power. Heterodyning reduces the optical power requirements.

SUMMARY OF THE INVENTION

The exemplary embodiments of the invention feature generation of orthogonal polarization states within the shearing interferometer and the reference path by placing a half-wave plate in one segment. The reference leg contains acousto-optic modulators to create two intermediate observable frequencies. Mixing the reference and measurement beams on a high-speed focal plane array creates an interference pattern with two carrier frequencies. Each carrier contains information pertaining to one segment of the shearing interferometer, both identically Doppler shifted due to time varying path length changes in the axial dimension of the interrogation beam. Demodulation routines extract the phase shift as a function of time for each pixel. The phase difference between each carrier represents the relative phase of the light reflected from the target surface. Separation of each segment also allows simultaneous whole field Doppler velocity and electronic speckle pattern interferometry (ESPI) measurements. Additionally, the phase extraction from the carrier frequencies provides variable shear quantitative phase measurements, comparable to a spatial phase shift measurement, but without requiring division of the focal plane array into four quadrants.

In one aspect, a heterodyne shearographic vibrometer is disclosed. An exemplary heterodyne shearographic vibrometer is comprised of a laser source emitting a laser; a first beam splitter to split said emitted laser into a probe path to provide a measurement beam and a reference path to provide a reference beam; a beam expander to expand the measurement beam in the probe path; a first measurement mirror to direct the measurement beam as expanded to a target, the target having a diffuse surface to reflect the directed measurement beam as scattered radiation; a plano-convex lens to collect a portion of the scattered radiation as a collected beam; a first measurement polarizing filter to filter the collected beam; a first measurement beam splitter to split the collected beam into a transmitted measurement beam and a reflected measurement beam; a first measurement half wave plate to rotate polarization of the transmitted measurement beam as a rotated measurement beam; a second measurement mirror to redirect the rotated measurement beam as a redirected rotated measurement beam; a third measurement mirror to redirect the reflected measurement beam as a redirected reflected measurement beam; a second measurement polarizing beam splitter to combine the redirected reflected measurement beam and the redirected rotated measurement beam as a combined measurement beam; a focusing lens to focus and minimize the combined measurement beam as a focused combined measurement beam; a first reference beam splitter to split the reference beam into a transmitted reference beam and a reflected reference beam; a first acousto optic modulator to frequency downshift the reflected reference beam by a first carrier frequency as a frequency shifted reflected reference beam; a first reference mirror to redirect the frequency shifted reflected reference beam as a redirected reflected reference beam; a first reference half wave plate to rotate the redirected reflected reference beam as a rotated reflected reference beam; a second acousto optic modulator to frequency downshift the transmitted reference beam by a second carrier frequency as a frequency shifted transmitted reference beam; a second reference mirror to reflect the frequency shifted transmitted reference beam as a redirected reference beam; a second reference polarizing beam splitter combines the redirected reference beam and the rotated reflected reference beam as a combined reference beam; a first reference lens which expands the combined reference beam as a expanded reference beam; a second beam splitter which combines the expanded reference beam and the focused combined measurement beam as combined beams; a focal plane array to receive said combined beams to output focal plane array electrical charges as output charges; a trans impedance amplifier to convert the output charges into digital signals; and a signal processor to receive and process the digital signals for data display.

In another aspect, a method for phase resolved heterodyne shearographic measurements is disclosed. An exemplary method comprises the steps of emitting a linearly polarized laser by a laser source; a first beam splitter splitting said emitted laser into a measurement beam and a reference beam; expanding and collimating the measurement beam using a beam expander; redirecting the measurement beam as expanded using a first measurement mirror to a dynamic object having a diffuse surface; diffuse scattering the directed measurement beam against the diffuse surface of the dynamic object as scattered radiation; collecting a portion of the scattered radiation as a collected beam using a plano-convex lens; absorbing a vertically polarized radiation component of the collected beam using a first measurement dichroic polarizing filter to filter the collected beam; dividing the collected beam as filtered into a transmitted measurement beam and a reflected measurement beam using a first measurement beam splitter as a shearing interferometer; rotating polarization of the transmitted measurement beam 90 degrees as a rotated measurement beam using a first measurement half wave plate; redirecting the rotated measurement beam as a redirected rotated measurement beam using a second measurement mirror; redirecting the reflected measurement beam as a redirected reflected measurement beam that is unrotated using a third measurement mirror; combining the redirected reflected measurement beam that is unrotated and the redirected rotated measurement beam as a combined measurement beam using a second measurement polarizing beam splitter; focusing the combined measurement beam using a focusing lens; splitting the reference beam using a first reference beam splitter into a transmitted reference beam and a reflected reference beam; frequency downshifting the reflected reference beam by a first carrier frequency as a frequency shifted reflected reference beam using a first acousto optic modulator; redirecting the frequency shifted reflected reference beam as a redirected reflected reference beam using a first reference mirror; rotating polarization of the redirected reflected reference beam 90 degrees as a rotated reflected reference beam using a first reference half wave plate; frequency downshifting the transmitted reference beam by a second carrier frequency as a frequency shifted transmitted reference beam using a second acousto optic modulator; reflecting the frequency shifted transmitted reference beam as a redirected reference beam using a second reference mirror; combining the redirected reference beam and the rotated reflected reference beam as a combined reference beam using a second reference polarizing beam splitter; expanding the combined reference beam as an expanded reference beam using a first reference lens; combining the expanded reference beam and the focused combined measurement beam as combined beams using a second non-polarizing beam splitter; transducing an irradiance of fields associated with the combined beams into an electrical charge proportional to the irradiance using a focal plane array to output focal plane array electrical charges as output charges; converting said output charges from the focal plane array as digital signals; and processing on a computer the digital signals to display a digital representation of the surface gradient of displacement and axial velocity.

In yet another aspect, a digital signal process is disclosed to compute on a computer a phase resolved gradient of displacement based on phase resolved heterodyne shearographic measurements. An exemplary digital signal process comprises the steps of accessing temporal spatial irradiance data stored on a computer as a sequence of pixel-based image frames; isolating heterodyne signal from a complete measurement by high-pass filtering each pixel independently to output heterodyne information at local oscillator frequencies of first and second carrier frequencies; multiplying each pixel by sine and cosine of the first carrier frequency to calculate in-phase and quadrature phase time sequences for the first carrier frequency; low pass filtering the resulting in-phase and quadrature time sequences to remove unwanted components predominantly at twice the first carrier frequency and produce first filtered in-phase and quadrature time sequences; producing an estimate of Doppler phase at each pixel for the first carrier frequency by arctangent demodulation of the first filtered in-phase and quadrature time sequences using the first carrier frequency; multiplying each pixel by sine and cosine of the second carrier frequency to calculate in-phase and quadrature phase time sequences for the second carrier frequency; low pass filtering the resulting in-phase and quadrature time sequences to remove unwanted components predominantly at twice the second carrier frequency and produce second filtered in-phase and quadrature time sequences; producing an estimate of Doppler phase at each pixel for the second carrier frequency by arctangent demodulation of the second filtered in-phase and quadrature time sequences using the second carrier frequency; applying a spatial offset to the Doppler phase from the second carrier frequency to adjust a shearing distance and output a spatially shifted estimate of Doppler phase for the second carrier frequency; subtracting the first carrier frequency estimate of Doppler phase from the spatially shifted estimate of Doppler phase for the second carrier frequency to produce a series of frames containing a relative phase between two segments of shearing interferometer; generating a shearogram by subtracting a phase image in a reference frame from a phase image in a target frame; applying an iterative phase filter for visualization of a phase image and noise removal; and applying an unwrapping routine to the phase image to yield a representation of gradient of displacement.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

Figure 1:
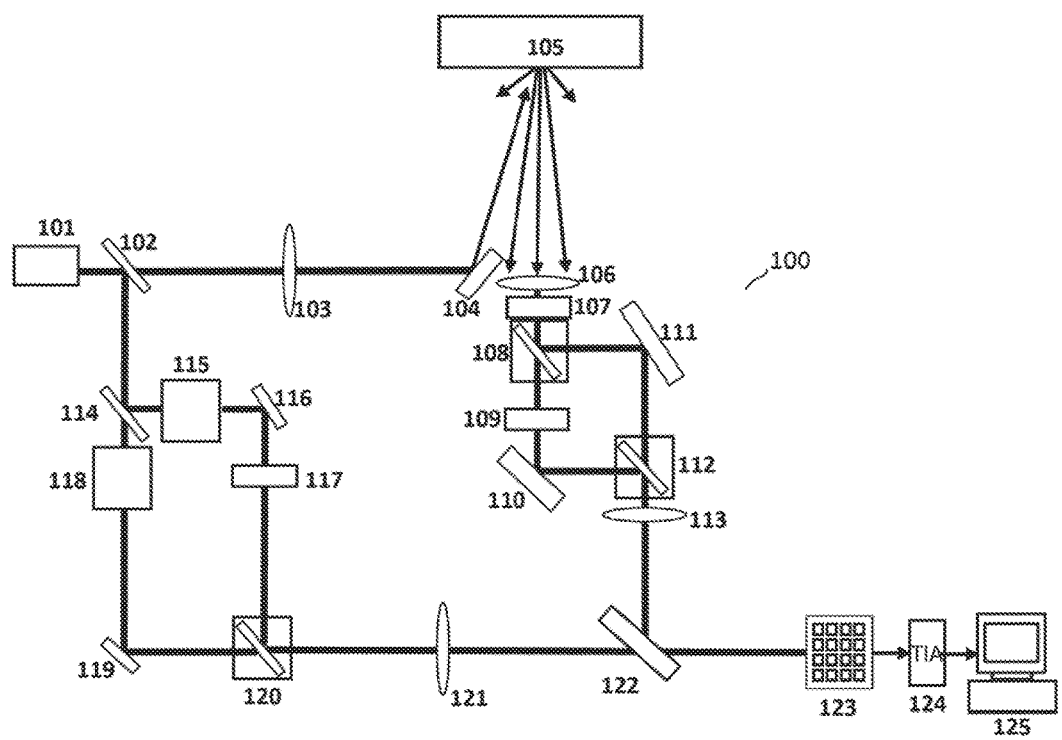
FIG. 1 shows a laboratory sensor schematic of an exemplary heterodyne shearographic vibrometer with a dynamic diffuse-scatterer for the target.

FIG. 1 shows a laboratory sensor schematic of an exemplary heterodyne shearographic vibrometer 100 with a dynamic diffuse-scatterer for the target. Such an exemplary heterodyne shearographic vibrometer comprises a laser source 101; beam splitter 102; 50× beam expander 103; mirror 104; dynamic diffuse scatterer 105; 1000 mm planoconvex lens 106; polarizing filter 107; beam splitter 108; half wave plate 109; mirror 110; mirror 111; polarizing beam splitter 112; 3.5× beam, minimization and focusing 113 beam splitter 114; Acousto optic modulator (AGM) 115, 25 kHz downshift; mirror 116; half wave plate 117; AOM 118, 15 kHz downshift; mirror 119; polarizing beam splitter 120; 20× beam expander 121; beam splitter 122; focal plane array 123 (512×512 pixels at 60,000 frames/s); trans impedance amplifier 124; signal processor and data display 125.

Figure 2:
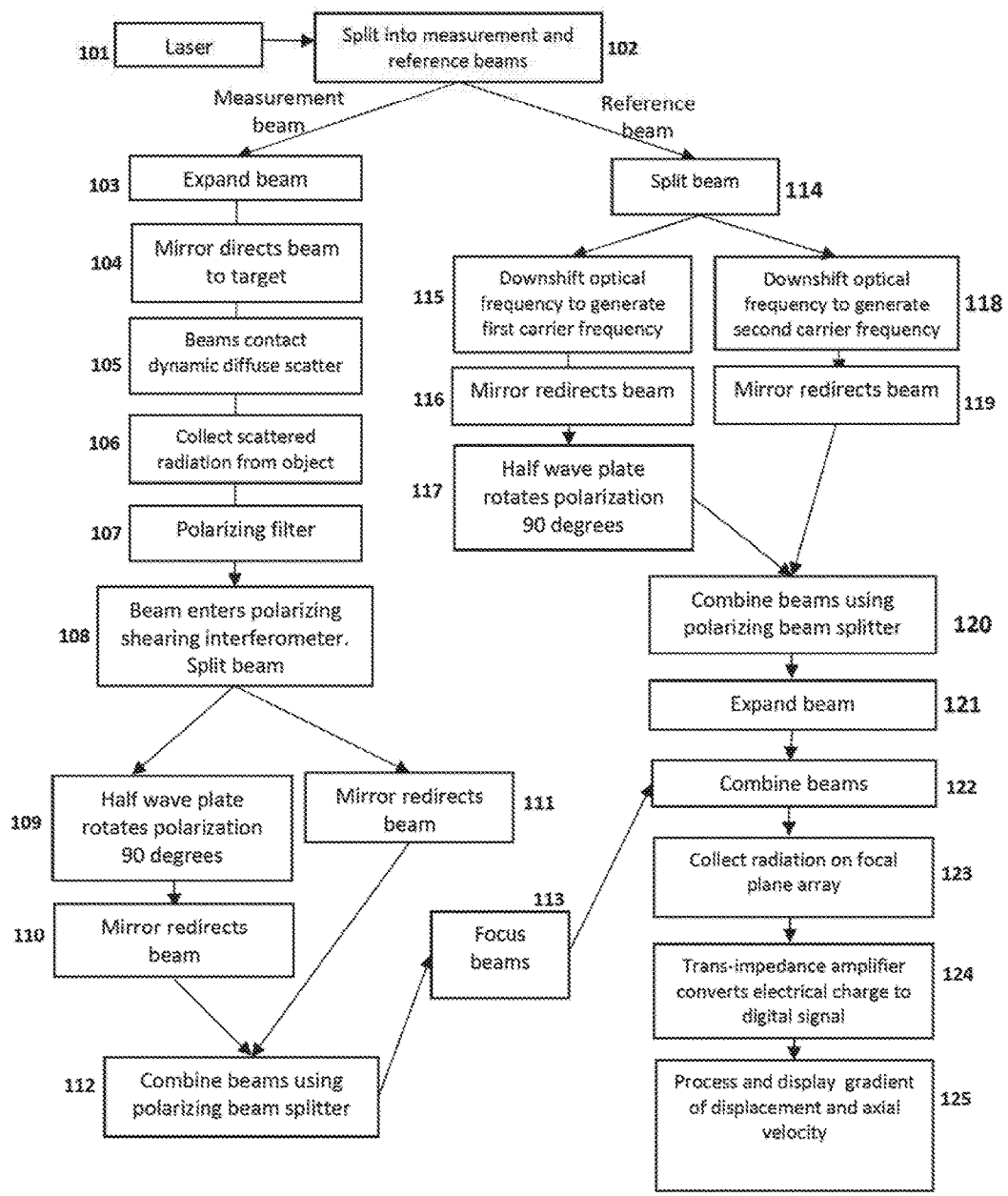
FIG. 2 shows an exemplary phase resolved heterodyne shearographic measurements block diagram as it relates to the sensor schematic in FIG. 1.
Figure 3:
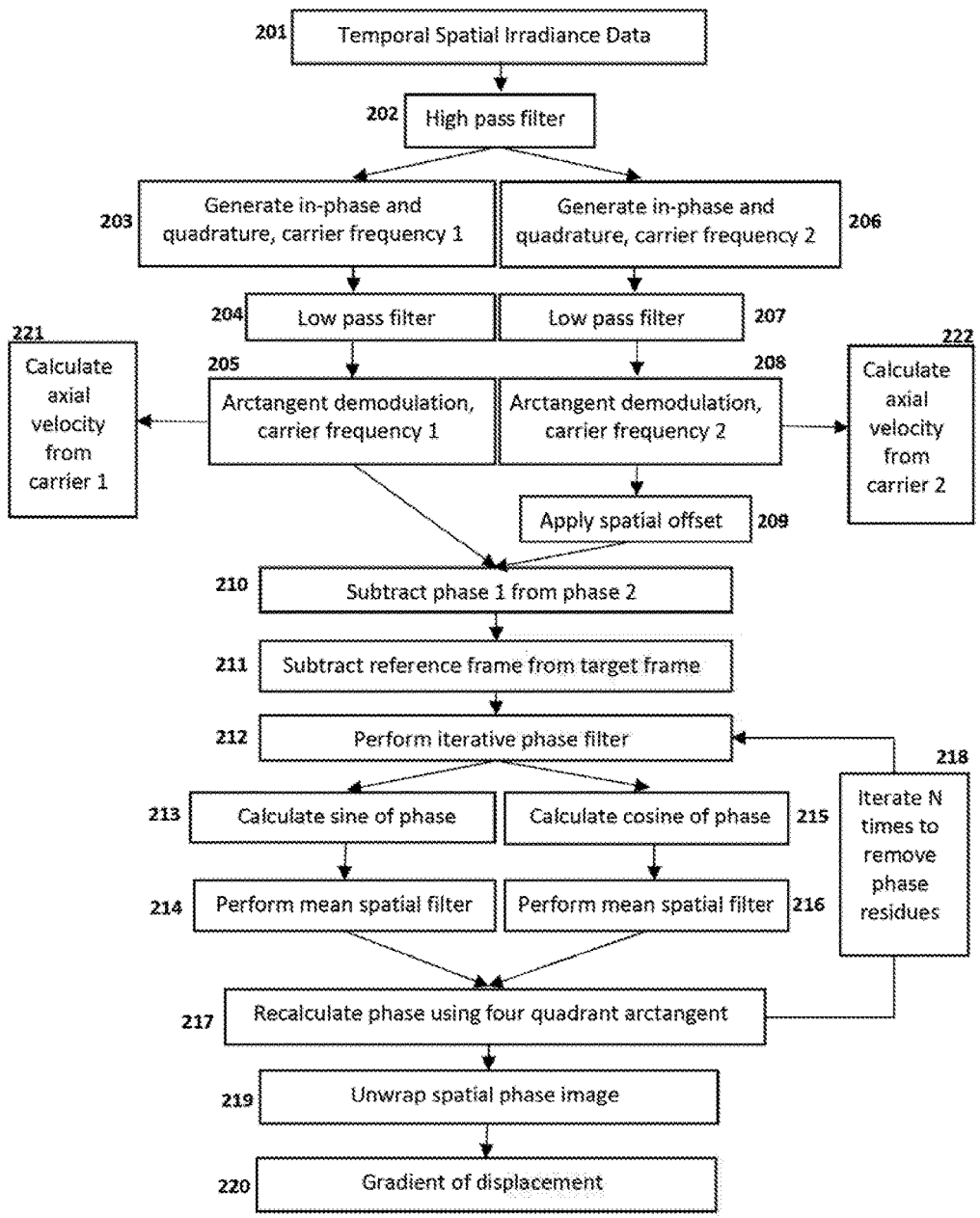
FIG. 3 shows an exemplary processing sequence performed by the signal processor in FIG. 2 to produce displacement gradients and axial velocity for display.

An exemplary method of operating a heterodyne shearographic vibrometer is also variously represented in FIGS. 2 and 3. For example, FIG. 2 shows an exemplary heterodyne shearographic measurements block diagram as it relates to the sensor schematic in FIG. 1. The source is a linearly polarized laser 101. A splitter 102 divides the source into a probe and reference beams. In the probe beam path, a beam expander 103, e.g., one or more lens, expand and collimate the probe (or measurement) beam, and mirror 104 redirects the beam to a dynamic object 105; the object has a diffuse surface. The electric field scatters from the moving object 105 and now has a random spatial phase or amplitude. The purpose of the invention is to determine changes to the surface displacement by tracking changes in the random, scattered electric field. As the object deforms, a phase shift is imparted due to the optical path change near the object plane 105. Thus, the optical field at the object is modified by a phase, associated with the new position of the object as follows:

$$u_o(\xi, \eta) \to u_o(\xi, \eta) e^{\frac{j2\pi\Delta P}{\lambda}}, \quad (1)$$

where $\lambda$ is the optical wavelength.

Some of the resulting scattered radiation is collected by a single lens 106. The beam propagates through a dichroic polarizing filter 107 where the vertically polarized radiation is absorbed. A splitter 108 divides the beams into a shearing interferometer. A half wave plate 109 rotates the polarization 90 degrees. A mirror 110 redirects the rotated beam to a polarizing beam splitter 112 which combines the rotated beam with an unrotated beam from the splitter 108, which was redirected by mirror 111. Lens 113 focuses the combined beams from the splitter 112. The combined beams propagate to a non-polarizing splitter 122.

Following initial propagation through the beam splitter 102, the reference beam propagates to a splitter 114 dividing the beam into two reference beams. Each beam propagates through an acousto-optic modulator (AOM), 115 and 118. AOM 115 downshifts the frequency by one carrier frequency, $\omega 1$. A mirror 116 redirects the beam to a half wave plate 117 which rotates the polarization 90 degrees. The beam then propagates to a polarizing beam splitter 120. AOM 118 downshifts the frequency by another carrier frequency, $\omega 2$. A mirror 119 redirects the beam to the polarizing beam splitter 120. The combined beams propagate to a lens 121 which expands the beam. The combined beams propagate to the non-polarizing splitter 122 where they combine with the probe beams from lens 113.

The combined beams from 122 propagate the focal plane array 123 which transduces the irradiance of the fields into an electrical charge proportional to the irradiance, described by $$I(x, y, t) = |R_1^2| + |R_2^2| + |M_1^2(x, y, t)| + |M^2(x, y, t)| + 2|R_1||M_1(x, y, t)|\cos[\omega_1 t + \psi_1(x, y, t)] + 2R_2||M_2(x, y, t)|\cos[\omega_2 t + \psi_2(x, y, t)], \quad (2)$$

where $R_{1,2}$ are the reference segment amplitudes, $M_{1,2}$ are the probe segment amplitudes, $\omega_{1,2}$ are the carrier frequencies, and $\psi_{1,2}$ are the phase shifts due to target motion which contains the random object phase.

A trans-impedance amplifier circuit 124 converts charge from the focal plane array 123 into a digital representation of the irradiance on a computer 125.

The sequence of image frames captured on the computer 125 undergoes a process on the same computer to calculate the phase resolved gradient of displacement as well as axial velocity. The process is outlined in FIG. 3.

The process to produce displacement gradients and axial velocity is based on extracting time varying phase shifts from multiple carrier frequencies. First, the image data stored on the computer 125 is accessed 201. The heterodyne signal is isolated from the complete measurement by high-pass filtering 202 each pixel independently. This filter removes $R_1^2$, $R_2^2$, and $M_2^2$ from the camera's representation of the optical field, equation 2. The filter 202 outputs the heterodyne information at the local oscillator frequencies $\omega_1$, $\omega_2$. In-phase and quadrature 203, 206 are calculated for each carrier frequency by multiplying each pixel by the sine and cosine of the local oscillator frequency. The resulting in-phase $I_{demod}$ and quadrature $Q_{demod}$ time sequences are low pass filtered 204, 207 to remove unwanted components predominantly at twice the carrier frequency as follows:

$$Q_{1,2}(t) = LP[HP[I(t)]\sin(\omega_{1,2}t)] \quad (3)$$

$$I_{1,2}(t) = LP[HP[I(t)]\cos(\omega_{1,2}t)] \quad (4)$$

The in-phase and quadrature terms are then processed in block 205, 208 that contains mathematical equation 4 and produces an estimate of the Doppler phase $\psi$ at each pixel.

$$\psi_{1,2} \approx \text{unwrap}\left[\tan^{-1}\left(\frac{Q_{1,2}(t)}{I_{1,2}(t)}\right)\right]. \quad (5)$$

The axial velocity can be estimated for each carrier 221, 222 using the Doppler phase, $$v = \frac{\lambda}{4\pi}\left(\frac{\partial \psi}{\partial t}\right). \quad (6)$$

The output of 221 and 222 are whole-field velocity images.

To continue with the calculation of displacement gradients, the output of 208 is spatially shifted, 209. The outputs of 205 and 209 subtracted, 210. The output is a series of frames containing the relative phase between both segments of the shearing interferometer. Shearographic image generation requires two sets of images, a reference with one deformation condition and a test case with another deformation condition. With the heterodyne technique, multiple frames have been acquired allowing investigation of numerous conditions. To generate the shearogram, the phase image from the reference frame should be subtracted from the phase image from the test frame, 211. For visualization and noise removal, are iterative phase filter is applied, 212-218. The sine, 213 and cosine, 215 of the phase is calculated and then a mean filter, 214 and 216 is applied to 213 and 215. The phase is then recalculated using a four quadrant arctangent, 217. This process needs to be repeated N times to remove phase residues, 218. Following noise removal, are unwrapping routine should be applied to the phase image, 219. This yields a phase resolved representation of the gradient of displacement, 220.

It is obvious that many modifications and variations of the present invention are possible in light of the above teachings. It is therefore to be understood that within the scope of the appended claims, the invention may be practiced otherwise than as described.

What is claimed is:

1. A digital signal process to compute on a computer a phase resolved gradient of displacement based on phase resolved heterodyne shearographic measurements, the digital signal process comprising the steps of:
    accessing temporal spatial irradiance data stored on a computer as a sequence of pixel-based image frames;
    isolating heterodyne signal from a complete measurement by high-pass filtering each pixel independently to output heterodyne information at local oscillator frequencies of first and second carrier frequencies;
    multiplying each pixel by sine and cosine of the first carrier frequency to calculate in-phase and quadrature phase time sequences for the first carrier frequency;
    low pass filtering the resulting in-phase and quadrature time sequences to remove unwanted components predominantly at twice the first carrier frequency and produce first filtered in-phase and quadrature time sequences;
    producing an estimate of Doppler phase at each pixel for the first carrier frequency by arctangent demodulation of the first filtered in-phase and quadrature time sequences using the first carrier frequency;
    multiplying each pixel by sine and cosine of the second carrier frequency to calculate in-phase and quadrature phase time sequences for the second carrier frequency;
    low pass filtering the resulting in-phase and quadrature time sequences to remove unwanted components predominantly at twice the second carrier frequency and produce second filtered in-phase and quadrature time sequences;
    producing an estimate of Doppler phase at each pixel for the second carrier frequency by arctangent demodulation of the second filtered in-phase and quadrature time sequences using the second carrier frequency;
    applying a spatial offset to the Doppler phase from the second carrier frequency to adjust a shearing distance and output a spatially shifted estimate of Doppler phase for the second carrier frequency;
    subtracting the first carrier frequency estimate of Doppler phase from the spatially shifted estimate of Doppler phase for the second carrier frequency to produce a series of frames containing a relative phase between two segments of shearing interferometer;
    generating a shearogram by subtracting a phase image in a reference frame from a phase image in a target frame;
    applying an iterative phase filter for visualization of a phase image and noise removal; and
    applying an unwrapping routine to the phase image to yield a representation of gradient of displacement.

2. The digital signal process as recited in claim 1, further comprising the steps of:
    calculating an axial velocity for the first carrier frequency to produce whole-field velocity images for the first carrier frequency; and
    calculating an axial velocity for the second carrier frequency to produce whole-field velocity images for the second carrier frequency.

3. The digital signal process as recited in claim 1, wherein said iterative phase filter is applied for visualization and noise removal as follows:
    calculating a sine of phase;
    applying a mean filter to the sine of phase;
    calculating a cosine of phase;
    applying a mean filter to the cosine of phase; and
    recalculating the phase using a four quadrant arctangent.

4. The digital signal process as recited in claim 3, wherein said iterative phase filter is iteratively repeated to remove phase residues.

* * * * *